(12) United States Patent
Jung

(10) Patent No.: US 11,566,578 B2
(45) Date of Patent: Jan. 31, 2023

(54) METHOD FOR OPERATING AN INTERNAL COMBUSTION ENGINE PERFORMING AN INJECTION QUANTITY CORRECTION

(71) Applicant: Vitesco Technologies GmbH, Hannover (DE)

(72) Inventor: Uwe Jung, Wörth a. d. Donau (DE)

(73) Assignee: VITESCO TECHNOLOGIES GMBH, Hannover (DE)

( * ) Notice: Subject to any disclaimer, the term of this patent is extended or adjusted under 35 U.S.C. 154(b) by 0 days.

(21) Appl. No.: 17/306,806

(22) Filed: May 3, 2021

(65) Prior Publication Data

US 2021/0254574 A1     Aug. 19, 2021

Related U.S. Application Data

(63) Continuation of application No. PCT/EP2019/078985, filed on Oct. 24, 2019.

(30) Foreign Application Priority Data

Nov. 8, 2018   (DE) ..................... 10 2018 219 028.3

(51) Int. Cl.
    *F02D 41/30*    (2006.01)

(52) U.S. Cl.
    CPC .. *F02D 41/3005* (2013.01); *F02D 2200/0614* (2013.01); *F02D 2200/0618* (2013.01)

(58) Field of Classification Search
    CPC ......... F02D 41/3005; F02D 2200/0614; F02D 2200/0618
    See application file for complete search history.

(56) References Cited

U.S. PATENT DOCUMENTS

| 9,617,946 | B2* | 4/2017 | Gutscher | F02D 41/2432 |
| 9,677,525 | B2* | 6/2017 | Cavanna | F02D 41/402 |
| 9,689,342 | B2* | 6/2017 | Ranga | F02B 3/12 |
| 9,719,453 | B2* | 8/2017 | Beer | F02M 65/00 |
| 2006/0107936 | A1 | 5/2006 | Henri et al. | |
| 2009/0070012 | A1 | 3/2009 | Achleitner et al. | |

(Continued)

FOREIGN PATENT DOCUMENTS

| DE | 10317684 A1 | 10/2004 |
| DE | 10343759 A1 | 4/2005 |

(Continued)

OTHER PUBLICATIONS

International Search Report and Written Opinion dated Jan. 28, 2020 from corresponding International Patent Application No. PCT/EP2019/078985.

(Continued)

*Primary Examiner* — Kurt Philip Liethen

(57) ABSTRACT

A method for operating a combustion engine performing an injection quantity correction is described. A total injection quantity per pulse of an injector is divided into a plurality of smaller equal quantity pulses. The smaller quantity pulses are implemented in ballistic injector mode. On the basis of this step, a corresponding offset correction is carried out. After the offset correction has been applied, a further correction is carried out in linear injector mode. An additional alternative for performing an injection quantity correction without additional sensor hardware is thereby provided.

4 Claims, 6 Drawing Sheets

Position A
Injector closed

Position B
Clearance closed

Position C
Throttling by needle

Position D
Min throttling

Case D1
Relevant throttling by nozzle plate

Case D2
Relevant throttling by nozzle plate & needle

(56) References Cited

U.S. PATENT DOCUMENTS

| | | |
|---|---|---|
| 2011/0202255 A1 | 8/2011 | Hauser et al. |
| 2015/0300286 A1* | 10/2015 | Ikemoto .............. F02D 41/22 |
| | | 73/114.48 |
| 2016/0084189 A1* | 3/2016 | Pursifull ........... F02M 63/0285 |
| | | 123/456 |
| 2017/0350299 A1* | 12/2017 | Nakada ............ B01D 53/9409 |
| 2018/0066557 A1* | 3/2018 | Nakada ................... F01N 9/00 |
| 2018/0179968 A1* | 6/2018 | Shimizu ............. F02D 41/3047 |
| 2019/0301391 A1* | 10/2019 | Shimizu ................ F02P 5/045 |

FOREIGN PATENT DOCUMENTS

| | | |
|---|---|---|
| DE | 102006019894 B3 | 7/2007 |
| DE | 102006009920 A1 | 9/2007 |
| DE | 602004003390 T2 | 10/2007 |
| DE | 102008051820 A1 | 4/2010 |
| DE | 102010016736 A1 | 11/2010 |
| DE | 102010042852 A1 | 4/2012 |
| DE | 102011085926 A1 | 5/2013 |

OTHER PUBLICATIONS

German Office Action dated Jun. 26, 2019 for corresponding German Patent Application No. 10 2018 219 028.3.

\* cited by examiner

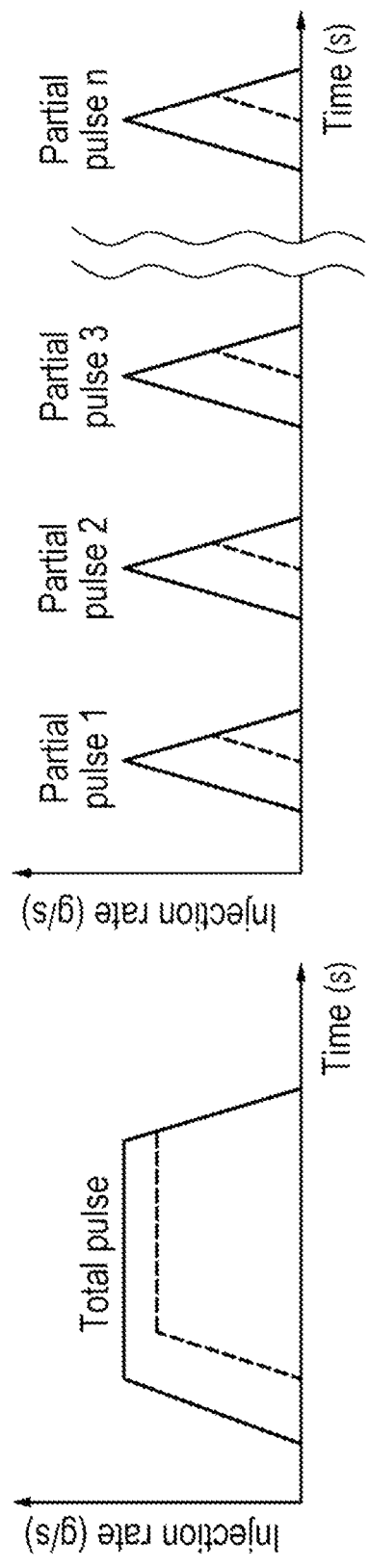
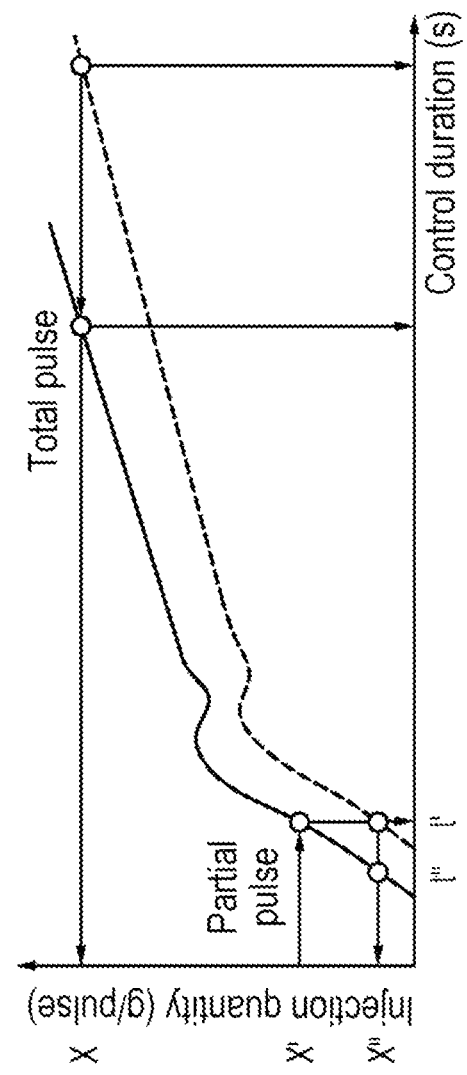

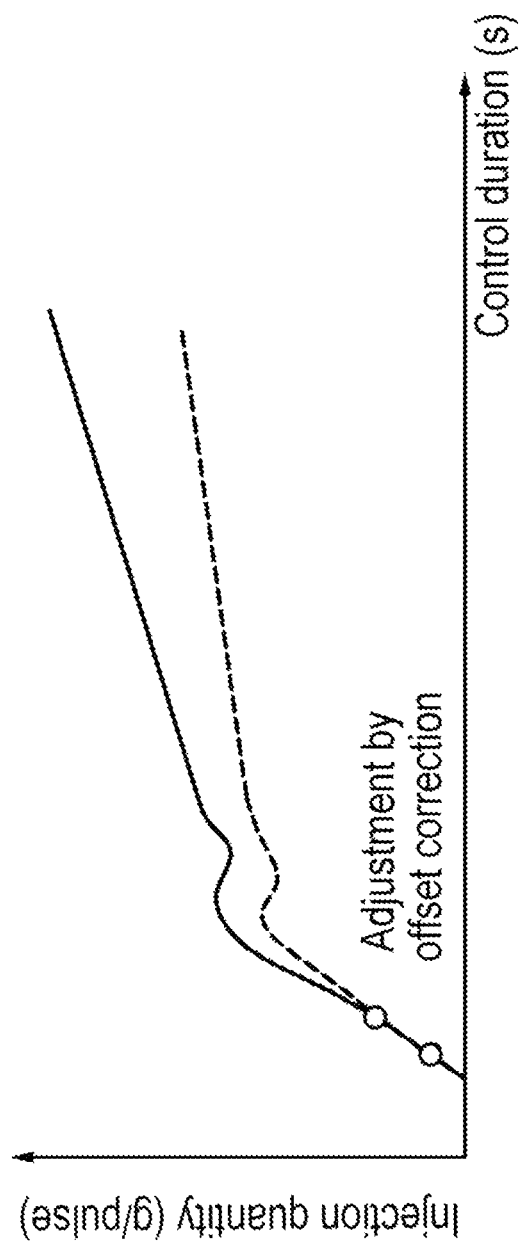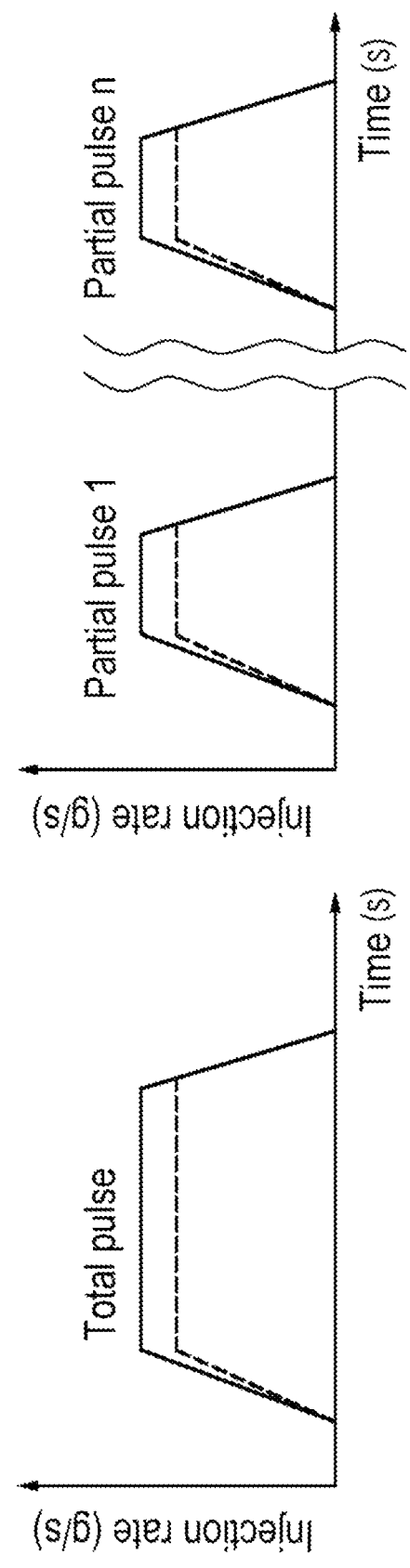

METHOD FOR OPERATING AN INTERNAL COMBUSTION ENGINE PERFORMING AN INJECTION QUANTITY CORRECTION

CROSS-REFERENCE TO RELATED APPLICATIONS

This application claims the benefit of International Application PCT/EP2019/078985, filed Oct. 24, 2019, which claims priority to German Application DE 10 2018 219 028.3, filed Nov. 8, 2018. The disclosures of the above applications are incorporated herein by reference.

TECHNICAL FIELD

The disclosure relates to a method for operating a combustion engine, having at least one injector, performing an injection quantity correction.

BACKGROUND

During operation, combustion engines are subject to a certain amount of wear and to a change in their technical properties. In order to comply with legislation relating to emissions, narrow tolerances are to be maintained in the manufacture of the components. Any detection of the changes that occur during the running time allows the manufacturing tolerances to be widened and/or more advantageous materials to be used, which ultimately leads to a lower product price or increased profit. Alternatively, such detection algorithms can be used to achieve higher objectives in terms of performance and/or emissions.

Hitherto, detection algorithms based on sensor signals of the injector have been used for quantity correction. Electromechanical properties are thereby used to detect characteristic points in the injector behavior and to always set them temporally at the same value by way of regulation. A disadvantage of this method is that, when detecting the opening behavior, the conventional activation signal can generally not be used. A transfer from detection to operational activation is necessary.

No method is known today that permits a change of the maximum flow through the nozzle on the basis of the injector properties. There are methods which make a conclusion about the quantity of fuel injected on the basis of the measured pressure drop in the rail/supply line. In systems implemented today, the full-load quantity deviation is in most cases echoed in an offset correction of the lambda controller, where no distinction is made between an air error and a fuel error.

SUMMARY

The disclosure provides a method of the type described at the beginning which represents an additional alternative for performing an injection quantity correction without additional sensor hardware.

The method of the specified type includes the following steps: dividing the total injection quantity X per pulse of the injector into a plurality of smaller equal quantity pulses X' of equal total quantity, where the smaller quantity pulses are implemented in the ballistic injector region; operating the smaller quantity pulses X' with an activation duration t' according to a nominal characteristic curve of the injector; back-calculating to the actual injection quantity X" from the air/fuel ratio; searching for X" on the nominal characteristic curve in order to determine the nominal necessary activation time t"; and determining the difference between t' and t" and performing a corresponding offset correction.

Implementations of the disclosure may include one or more of the following optional features. In some implementations, the present total injection quantity X is divided into a number of smaller equal quantity pulses X' of equal total quantity. It is important that the small quantity pulses are implemented in ballistic injector mode. As the activation duration for the ballistic pulses there is used t', which is found for the corresponding desired quantity on the nominal characteristic curve. On account of the solely ballistic pulses, any flow error is ineffective.

The injection quantity that is then implemented is too small. Since the entire air path remains unchanged during the transition, the determined lambda deviation is a result solely of the fuel error. The actual injection quantity X" may therefore be back-calculated from the air/fuel ratio. If X" is then sought on the nominal characteristic curve, the nominal necessary activation time t" is obtained. The difference between t' and t" is the required offset correction. When this correction is taken into account, the characteristic curve of the injector in question shifts towards the nominal characteristic curve.

In some implementations, the method includes the following steps, after the offset correction has been applied: dividing the total injection quantity Y per pulse of the injector into a plurality of smaller equal quantity pulses Y', where the smaller quantity pulses are implemented in linear injector mode; operating the smaller quantity pulses Y' with an activation duration s' according to a nominal characteristic curve; obtaining the quantity Y"; determining the deviation between Y' and Y" as the deviation of the gradient of the characteristic curves at that point; and repeating this procedure for various quantities/activation times and calculating and correcting the deviation of the gradient for the entire linear characteristic curve.

According to the same principle, the linear region is then considered with the offset correction applied. Here too, the total pulse Y is divided into multiple partial pulses Y'. It must thereby be ensured that the partial pulses Y' also reach the maximum flow or the needle stop of the injector. The quantity Y is divided into the quantity Y' and again operated with the activation duration s' according to the nominal characteristic curve. However, the quantity Y" is then actually established. The deviation between Y' and Y" is equivalent to the deviation of the gradient of the characteristic curves at that point. If the procedure is repeated for different quantities/activation times, the deviation of the gradient can be calculated and corrected for the entire linear characteristic curve.

If the entire method is performed for multiple different operating points and the frequency distribution of the determined corrections is taken into account, the detection precision can be increased significantly.

Overall, the disclosure makes it possible, by utilizing the injector properties (in respect of ballistic and linear behavior), to perform an alternative opening detection without additional sensor hardware and a determination of the flow error of the injectors and accordingly a differentiation between air errors and fuel errors in the lambda control. As a result, in addition to improved injection quantity tolerance, narrower diagnosis limits or higher reliability of the lambda diagnosis, including an improvement in pin-pointing in the event of error, are achieved. Furthermore, the method represents an alternative detection method for injector opening behavior. Even when opening detection by sensors is used, the method described here permits at least plausibilization of the detection by sensors.

Similarly, the method described here can be combined with other "flow recognizing" methods, for example pressure drop, for mutual plausibilization. A requirement in all cases is the use of injector closing point control.

The details of one or more implementations of the disclosure are set forth in the accompanying drawings and the description below. Other aspects, features, and advantages will be apparent from the description and drawings, and from the claims.

DESCRIPTION OF DRAWINGS

FIG. 5 shows a diagram which shows the injection rate as a function of time on the left and the injection rate as a function of time for individual partial pulses on the right;

FIG. 6 shows a diagram which shows the injection quantity as a function of the control duration;

FIG. 7 shows a diagram which shows the injection quantity as a function of the control duration;

FIG. 8 shows a diagram which shows the injection rate as a function of time for the total pulse on the left and the injection rate as a function of time for partial pulses on the right;

Like reference symbols in the various drawings indicate like elements.

DETAILED DESCRIPTION

The present disclosure provides a method for operating a combustion engine, having at least one injector, performing an injection quantity correction. Such a method will be explained hereinbelow.

Figure 1:
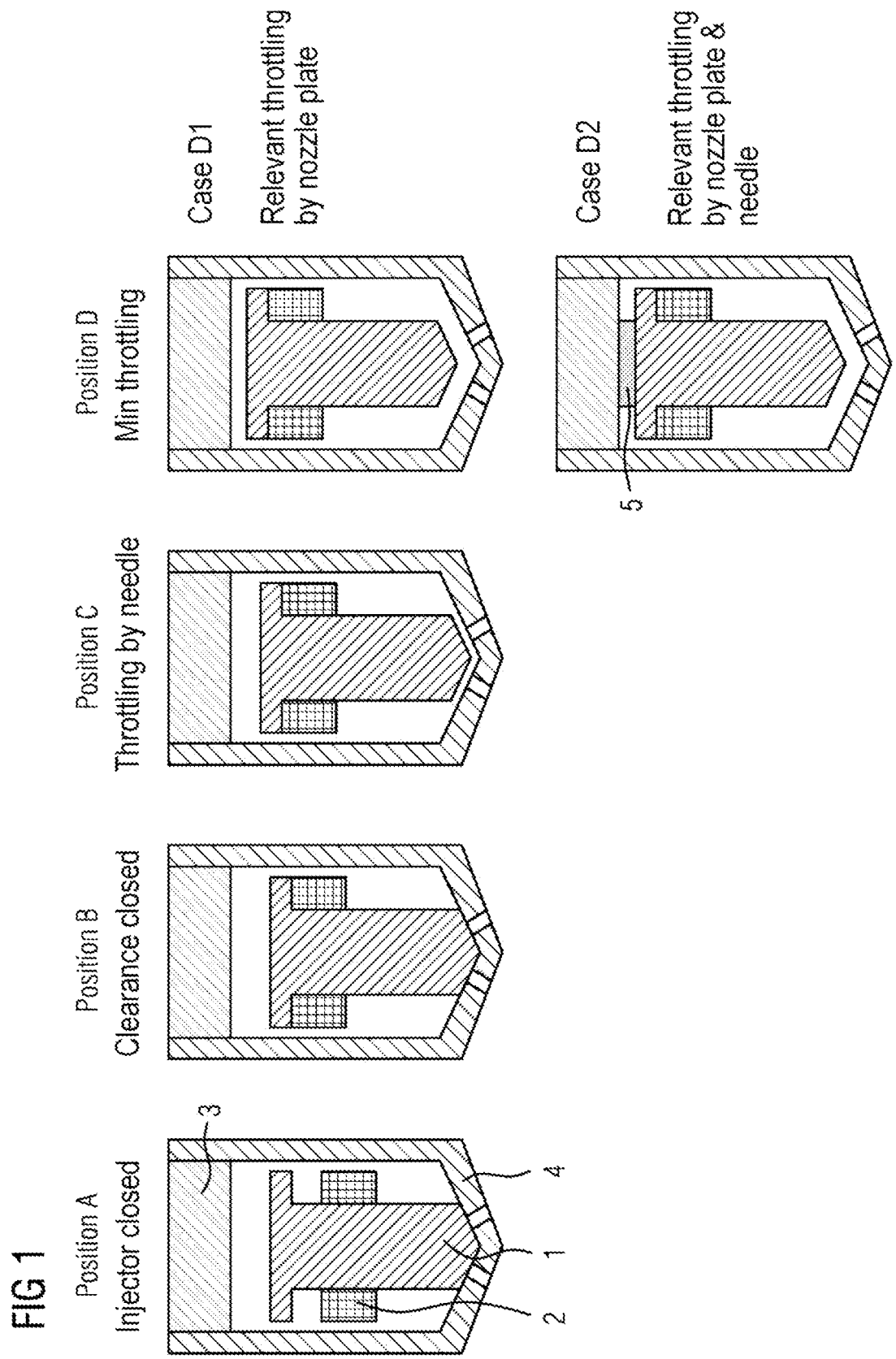
FIG. 1 is a schematic illustration of five opening phases of an injector.

The method utilizes the different injector properties in ballistic mode (needle stop or maximum flow is not reached=position A-C in FIG. 1) and in linear mode (needle stop or maximum flow is reliably reached, position D in FIG. 1). FIG. 1 shows various opening phases of an injector, where 1 denotes a nozzle needle, 2 denotes an armature, 3 denotes a magnet coil, 4 denotes a nozzle plate and 5 denotes a mechanical stop. FIG. 1 is merely a schematic illustration, where no springs, guides etc. are shown.

For the sake of simplicity, only a decrease in the injection quantity (broken lines) relative to the normal quantity (solid lines) is shown in the following figures. However, all the following statements also apply analogously to an increase in the quantity.

Figure 2:
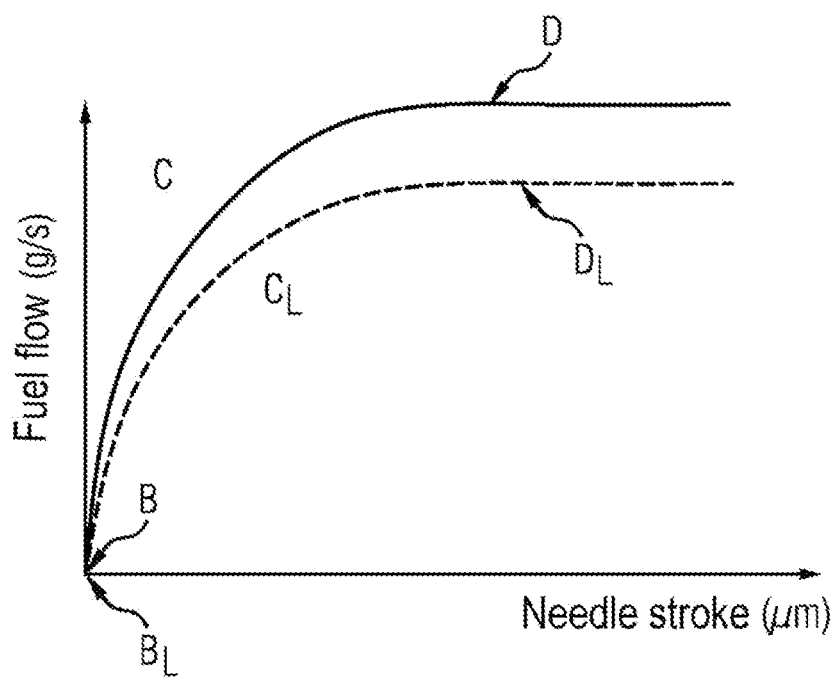
FIG. 2 shows a diagram which shows the flow through an injector in dependence on the needle stroke.
Figure 3:
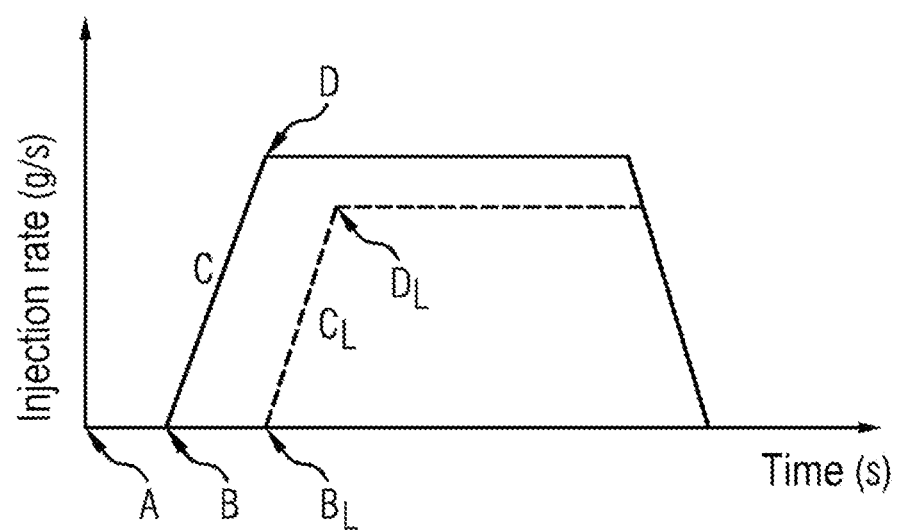
FIG. 3 shows a diagram which shows the injection rate as a function of time of the injector.
Figure 4:
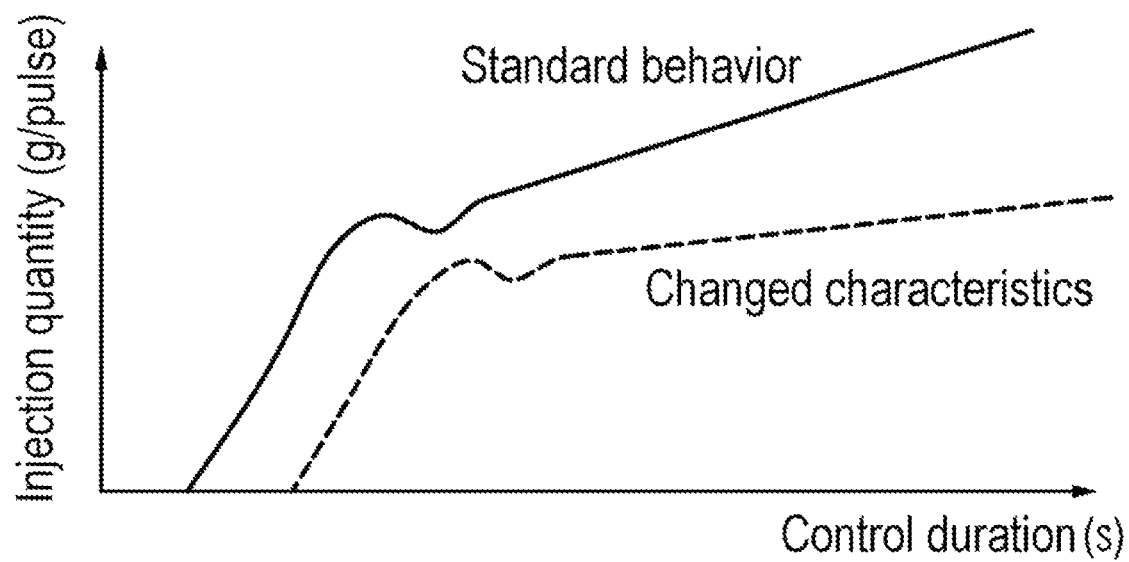
FIG. 4 shows a diagram which shows the injection quantity as a function of the control duration.
Figure 9:
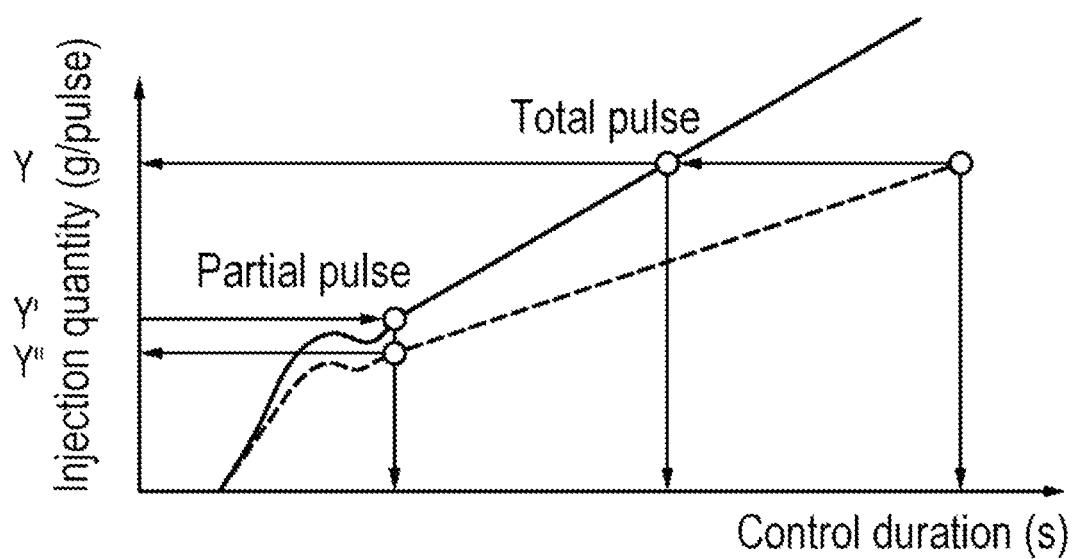
FIG. 9 shows a diagram which shows the injection quantity as a function of the control duration.

A fundamental wear/tolerance point is the clearance of the armature 2 (position A to B in FIG. 1). A changed clearance in principle represents a temporal offset of the quantity characteristic curve (FIG. 4) and at the injection rate start (B to $B_L$ in FIG. 3). In the illustration flow over needle stroke, a changed clearance is not noticeable (B to $B_L$ in FIG. 2).

The further substantial wear/tolerance point is the maximum flow (position D in FIG. 1). The flow is changeable via tolerances/wear of the nozzle plate 4 (D1 in FIG. 1) or by tolerances/wear of the stop 5 (D2 in FIG. 1). A change in the maximum flow in principle represents a gradient change in the quantity characteristic curve (FIG. 4) and a reduced maximum rate (D to $D_L$ in FIG. 3). A changed flow is also visible in the illustration flow over needle stroke (D to $D_L$ in FIG. 2).

The method utilizes this behavior. If the working region of the injector is in the linear region, the algorithm can be started. This is virtually already the case at very low engine loads, so that the detection can be applied virtually without limitations.

The present total injection quantity X is divided into a number n of smaller equal quantities X' of equal total quantity. It is important that the small quantity pulses are implemented in ballistic injector mode (FIGS. 5 and 6). As the activation duration for the ballistic pulses there is implemented the control duration t', which is found for the desired quantity on the nominal curve. On account of the solely ballistic pulses, any flow error is ineffective (FIG. 5). The injection quantity that is then implemented is too small. Since the entire air path remains unchanged during the transition, the determined lambda deviation is a result solely of the fuel error. The actual injection quantity X" may therefore also be back-calculated from the air/fuel ratio. If X" is then sought on the nominal characteristic curve, the nominal necessary activation time t" is obtained (FIG. 6). The difference between t' and t" is the required offset correction. When this correction is taken into account, the characteristic curve of the injector in question shifts towards the nominal characteristic curve (FIG. 7).

According to the same principle, the linear region is then considered with the offset correction applied. Here too, the total pulse is divided into multiple partial pulses. However, it must thereby be ensured that the partial pulses also reach the maximum flow or the needle stop (FIG. 8). The quantity Y is divided into the quantity Y' and again operated with the activation duration according to the nominal characteristic curve. However, the quantity Y" is then actually established. The deviation between Y' and Y" is equivalent to the deviation of the gradient of the characteristic curves at that point.

Figure 10:
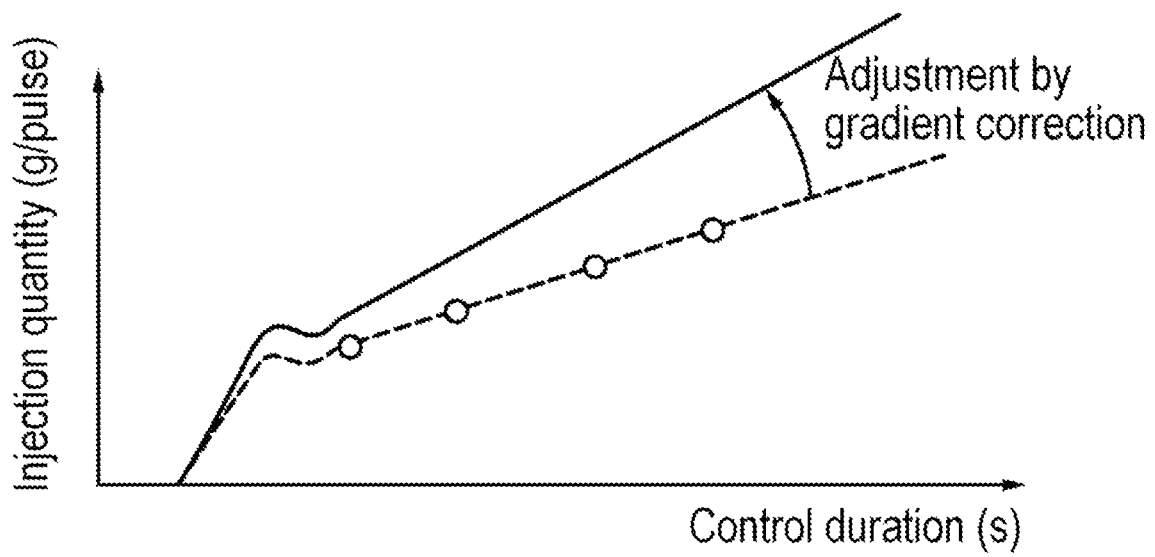
FIG. 10 shows a diagram which shows the injection quantity as a function of the control duration.

If the procedure is repeated for ≥2 different quantities/activation times, the deviation of the gradient can be calculated and corrected for the entire linear characteristic curve (FIG. 10). If the entire method is performed for multiple different operating points and the frequency distribution of the determined corrections is taken into account, the detection precision can be increased significantly.

A number of implementations have been described. Nevertheless, it will be understood that various modifications may be made without departing from the spirit and scope of the disclosure. Accordingly, other implementations are within the scope of the following claims.

What is claimed is:

1. A method for operating a combustion engine having an injector, the method comprising:
dividing a total injection quantity X per pulse of the injector into a plurality of smaller equal quantity pulses X' of equal total quantity, the smaller quantity pulses are implemented in ballistic injector mode;
operating the smaller quantity pulses X' with an activation duration t' according to a nominal characteristic curve of the injector;

back-calculating to an actual injection quantity X" from an air/fuel ratio;

searching for the actual injection quantity X" on the nominal characteristic curve in order to determine the nominal necessary activation time t"; and determining a difference between the activation duration t' and the nominal necessary activation time t"; and performing a corresponding offset correction of the injection quantity supplied by the injector;

wherein after the offset correction has been applied, the method further includes:

dividing a total injection quantity Y per pulse of the injector into a plurality of smaller equal quantity pulses Y', wherein the smaller quantity pulses are implemented in linear injector mode;

operating the smaller quantity pulses Y' with an activation duration s' according to a nominal characteristic curve;

obtaining a quantity Y";

determining a deviation between the smaller quantity pulses Y' and the obtained quantity Y" as the deviation of the gradient of the nominal characteristic curves at that point; and repeating this procedure for various quantities/activation times and calculating and correcting the deviation of the gradient for the entire linear characteristic curve.

2. The method as claimed in claim 1, wherein the method is performed for multiple different operating points.

3. The method as claimed in claim 2, wherein a frequency distribution of the determined corrections is evaluated in order to increase a detection precision.

4. The method as claimed in claim 1, further comprising:

detecting, using a sensor, an opening of the injector, wherein the method is performed for the plausibilization of the detection by the sensors.

\* \* \* \* \*